US007175159B1

(12) United States Patent
Gomillion

(10) Patent No.: US 7,175,159 B1
(45) Date of Patent: Feb. 13, 2007

(54) HYDRAULIC FLOOR JACK RELEASE AND METHOD OF USE

(76) Inventor: Maurice Gomillion, 9716 Caltor La., Fort Washington, MD (US) 20744

( * ) Notice: Subject to any disclaimer, the term of this patent is extended or adjusted under 35 U.S.C. 154(b) by 0 days.

(21) Appl. No.: 11/346,787

(22) Filed: Feb. 3, 2006

(51) Int. Cl.
*B60P 1/48* (2006.01)

(52) U.S. Cl. ..................... 254/8 R; 254/2 B; 254/10 B

(58) Field of Classification Search ................ 254/8 R, 254/2 B, 8 B, 10 B, 120, 134, 261
See application file for complete search history.

(56) References Cited

U.S. PATENT DOCUMENTS 1,513,217 A * 10/1924 Bunker ........................ 254/2 B
1,569,589 A * 1/1926 Stocker ....................... 254/2 B
2,039,896 A * 5/1936 Green ......................... 254/2 B
4,289,300 A 9/1981 Weisser et al.
6,086,047 A * 7/2000 Lee ............................ 254/8 B
6,966,542 B2 * 11/2005 Bettencourt ................. 254/131
2005/0092973 A1 * 5/2005 Tatsumi ...................... 254/8 B

* cited by examiner

*Primary Examiner*—Lee D. Wilson
(74) *Attorney, Agent, or Firm*—Raymond M. Galasso; Galasso & Associates, LP

(57) ABSTRACT

An automobile jack that comprises a hydraulic system. The jack includes a lockout button and a release mechanism comprised of a variable rate, spring-loaded trigger release mechanism which is located on the grip handle. Moving the jack handle upward and downward causes the hydraulic jack arm to raise and by disengaging the lock out button, the release mechanism allows the hydraulic jack arm to be moved downward. Once the desired height is reached, the lockout button is engaged. By engaging the lockout button, the jack arm is prevented from being moved downward. When it is time to maneuver the jack again, the lockout button has to be disengaged to allow for movement downward.

4 Claims, 2 Drawing Sheets

HYDRAULIC FLOOR JACK RELEASE AND METHOD OF USE

FIELD OF THE DISCLOSURE

A release mechanism on a hydraulic floor jack that enables the jack arm to be moved up and down with relative ease.

BACKGROUND

Auto mechanics use jacks all the time to raise cars up and down when working on them. Even individuals who work on cars out of necessity or enjoyment use jacks for lifting cars up. The easier it is to use a particular jack the better.

There are number of jacks that are on the market that vary in type and size. For example, there are the typical jacks that come with the purchase of most vehicles. It comprises a base with a lifting mechanism and a manual tool capable of inserting into the lifting mechanism and pumping the vehicle to a raised position. While this particular jack works for changing a tire along the side of a road, it does not provide an extremely stable environment.

There are also lift ramps that serve the same purpose. You drive a vehicle up on the ramps and either the front or back portion of the vehicle is lifted depending on which section is up on the ramp. This type of jack system is very common for people who work on their cars at home. It is convenient and provides a more stable environment that the typical car jack. Unfortunately, these ramps are somewhat large and cumbersome for carrying or storing.

The larger auto mechanic shops generally have a hydraulic type lift that lifts a vehicle completely off the ground. While this type of jack has its advantages when working underneath a car, should you have a need to have to start the vehicle, it becomes problematic. However, if you are changing the brakes or rotating the tires, this is an ideal situation because you have all four wheels off the ground at one time and do not have to worry about moving the jack from one place to another or having to have more than one jack. Some of the smaller mechanic shops or individual mechanics have what is called a floor jack. This is a jack that is capable of being rolled around on the floor from one spot to another based on what portion of the car you need to have lifted. This type of jack also works well when you are removing certain parts of a vehicle, i.e. the transmission. Because the transmission come out from under the car, this type of jack can be placed under the transmission so that when it is unbolted, the transmission rests on the jack and can then be wheeled out from under the car. Generally, these types of jacks work to lift with a pumping method. However, some of them do work off of an air compressor.

There are also a number of other hand jacks available on the market. An individuals needs would be the determining factor in selecting a jack.

One example of a hand jack is disclosed in U.S. Pat. No. 4,289,300 by Weisser et al. This particular jack comprises a column attached at its bottom to a base, and a load carrying arm pivoted to the column and moveable by a screw spindle. By turning the screw spindle in one direction the jack serves to lift, by turning the opposite direction, the jack serves to lower. Portions of this particular configuration has been incorporated into a number of jacks. The screw spindle has even been used in smaller versions of floor jacks.

Another version of a car jack is disclosed in U.S. Pat. Nos. 5,118,083 and 5,197,714 by Metzen. In this particular configuration, an upright member is provided with a pivotable base plate hinged on a first pivot at the bottom of the upright member. The base plate is held into place by a spring which has two sections. A first section of the spring rests against the upright and the base plate, whereas the second section of the spring rests against he base plate and an end of the supporting arm when the arm is completely folded up and against the upright.

There are lots of jacks available from hand operated jacks to much more sophisticated jacks. The driving factor behind using a particular jack is the ease of use and the environment in which the jack is being used, as well as the particular need for which the jack is being used.

SUMMARY OF THE DISCLOSURE

In one embodiment the automobile jack comprises a base having a length between 15 and 21 inches.

In another embodiment the automobile jack comprises a base having a height of four to eight inches.

In still another embodiment the automobile jack comprises a hydraulic jack arm.

In yet another embodiment the hydraulic jack arm is attached to the base.

In another embodiment the automobile jack comprises a housing.

In still another embodiment the housing comprises hydraulic fluid.

In yet another embodiment the automobile jack comprises a set of four wheels.

In another embodiment the four wheels would have one wheel located at each of the four corners.

In still another embodiment the automobile jack would comprise a tubular shaped handle with a slight angle at the grip end.

In yet another embodiment the tubular shaped handle would be attached to the rear of the base.

In another embodiment the automobile jack would comprise a release mechanism that enables the hydraulic jack arm to move downward.

In still another embodiment the automobile jack would comprise a lockout button.

In yet another embodiment the release mechanism is comprised of a variable rate, spring-loaded trigger release mechanism.

In another embodiment the hydraulic jack arm would raise when the release mechanism is not depressed and the handle is moved upward and downward.

In still another embodiment the hydraulic jack arm would lower when the release mechanism is depressed.

In yet another embodiment the release mechanism would be located on the underside of the grip handle.

In still another embodiment the lockout button functions to prevent the release mechanism from being depressed which allows the hydraulic jack arm to move downward.

Still other advantages of various embodiments will become apparent to those skilled in this art from the following description wherein there is shown and described preferred embodiments of this invention simply for the purposes of illustration. As will be realized, the invention is capable of other different aspects and embodiments without departing from the scope of the invention. Accordingly, the advantages, drawings, and descriptions are illustrative in nature and not restrictive in nature.

DETAILED DESCRIPTION OF THE DRAWING FIGURES

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
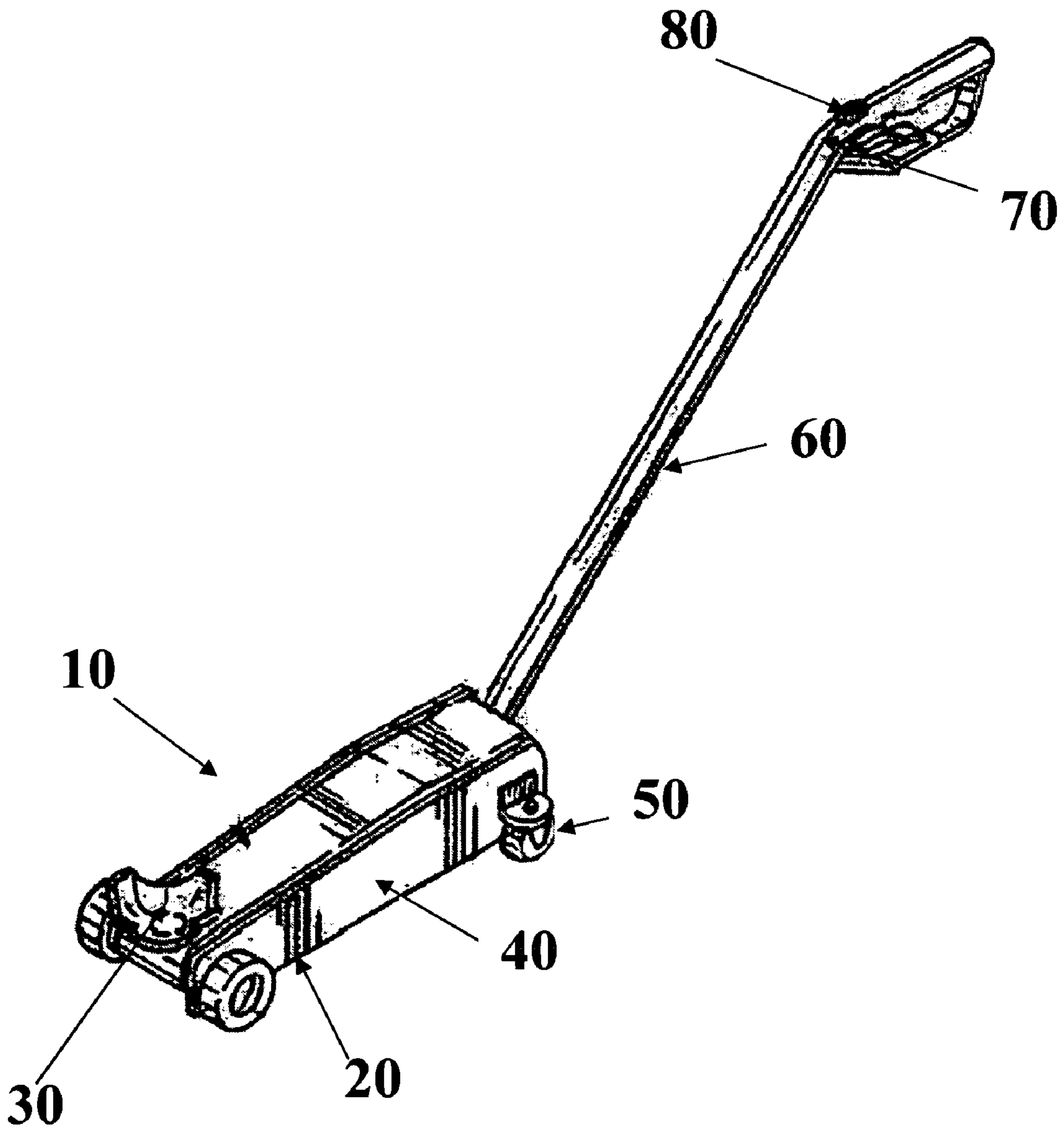
FIG. 1 is a perspective view of an automobile jack comprising a locking mechanism.

FIG. 1 is a perspective view illustrating an automobile jack 10 comprising a base 20, a hydraulic jack arm 30, a housing 40, wheels 50, a tubular shaped handle 60, a release mechanism 70, a lockout button 80 and a trigger guard 90. The automobile jack 10 is floor jack that is capable of moving from one spot to another by using the tubular shaped handle 60 causing the base 20 to roll on the wheels 50. The wheels 50 are designed to swivel easily, thereby allowing the automobile jack 10 to be easily maneuvered. Once the automobile jack 10 is placed at the point of lifting, while the release mechanism 70 is not depressed the jack handle is moved upward and downward causing the hydraulic jack arm 30 to raise. When the automobile jack 10 reaches the desired height, the lockout button 80 is engaged.

By engaging the lockout button 80, the release mechanism 70 is locked into place preventing release mechanism 70 from being depressed and causing the hydraulic jack arm 30 to move downward. By using the lockout button 80 to lock the release mechanism 70, the hydraulic jack arm 30 is held at a given point, preventing it from accidently lowering onto something or someone and causing serious injury. The release mechanism 70 will not function as long as the lockout button 80 is engaged.

The base 20 of the automobile jack 10 includes a housing 40 which encompasses the hydraulic fluid used to lift the hydraulic jack arm 30. The hydraulic fluid that caused the hydraulic jack arm 30 to move upward or downward is controlled by the release mechanism 70.

In order to lower the hydraulic jack arm 30 from a raised position, the lockout button 80 would be disengaged and the release mechanism 70 is depressed. This causes the hydraulic jack arm 30 to lower back down toward the base 20 of the automobile jack 10. When the hydraulic jack arm 30 clears the vehicle or other object being lifted, the automobile jack 10 can again be moved to another place by using the tubular shaped handle 60 to push the base 20 causing the wheels 50 to move.

Figure 2:
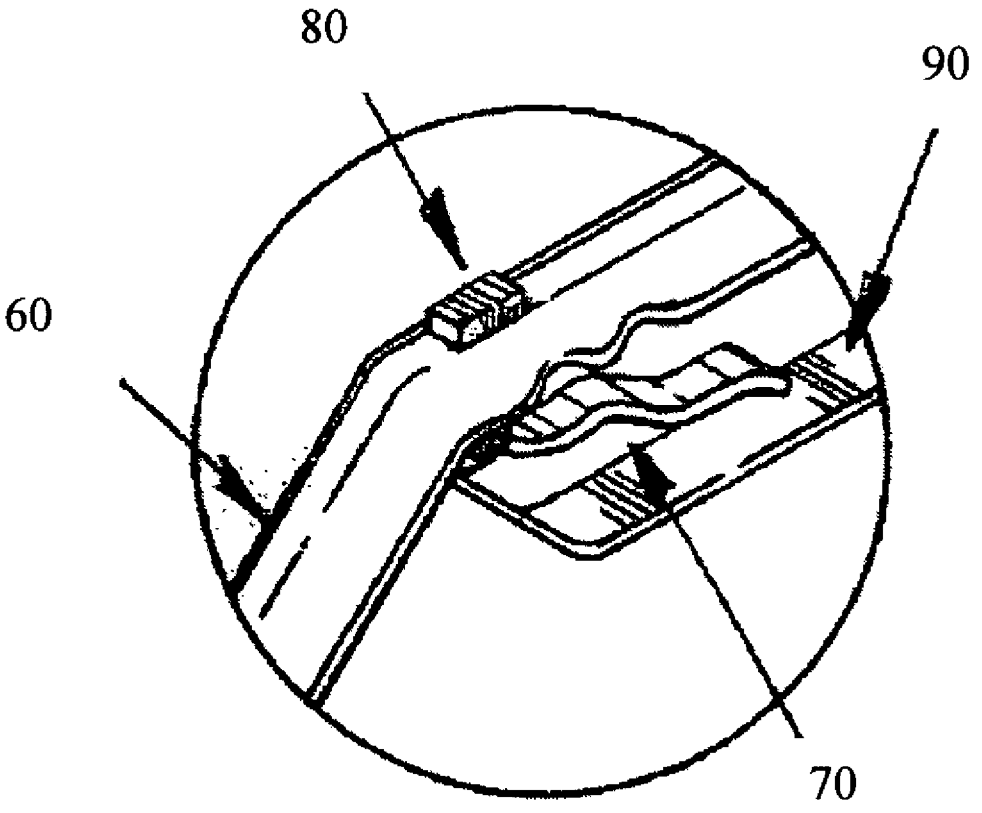
FIG. 2 is a detailed view of the lockout button and release mechanism described in FIG. 1

FIG. 2 depicts a detailed view of the tubular shaped handle 60 and more explicitly shows the release mechanism 70 and the lockout button 80. The tubular shaped handle 60 is used not only to move the automobile jack 10 from one spot to another, it also is used to house the controls necessary for the lockout button 80 and the release mechanism 70. The tubular shaped handle 60 is comprised of a heavy duty material such as steel or aluminum. The release mechanism 70 is also protected by a trigger guard 90 located with in the grip of the tubular shaped handle 60. The trigger guard 90 is another device that is used as a safety precaution, in addition to the lockout button 80. Since there are a number of accidents every year that involve jacks, this automobile jack 10 has been designed with safety in mind.

There are a number of types of lock and release mechanisms on the market. However, automobile jack 10 has been designed with a variable rate, spring-loaded trigger release mechanism. 80. This particular release mechanism 70 allows the jack to move downward based on pressure that is placed on the release mechanism 80.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. An automobile jack system comprising;

a base having a length between 15 and 21 inches and four to eight inches in height;

a hydraulic jack arm attached to the base on a first end;

a housing;

a set of four wheels located at each of the base's corners;

a tubular shaped handle with a slight angle at the grip end attached to the rear of the base;

a release mechanism operable to enable said hydraulic jack arm to move downward; and a lockout button which functions to prevent the release mechanism from being depressed allowing the hydraulic jack arm to move downward.

2. The automobile jack system of claim 1, wherein said release mechanism is comprised of a variable-rate, spring-loaded trigger release mechanism.

3. The automobile jack system of claim 1, wherein said housing contains hydraulic fluid.

4. An automobile jack comprising:

a base having a length between 15 and 21 inches and four to eight inches in height;

a hydraulic jack arm attached to the base on a first end;

a housing;

a set of four wheels with one located at each of the base's corners;

a tubular shaped handle with a slight angle at the grip end attached to the rear of the base;

a release mechanism that enables said hydraulic jack arm to move downward; and a lockout button, wherein said lockout button functions to prevent the release mechanism from being depressed which allows the hydraulic jack arm to move downward.

* * * * *